(No Model.)
W. C. McINTIRE.
COVER FOR BICYCLE SADDLES.
No. 536,538. Patented Mar. 26, 1895.
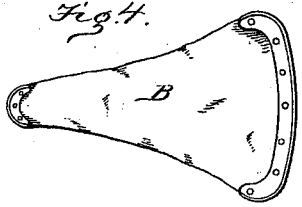
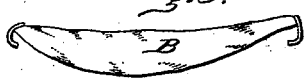
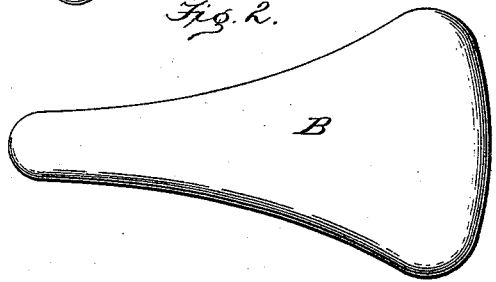
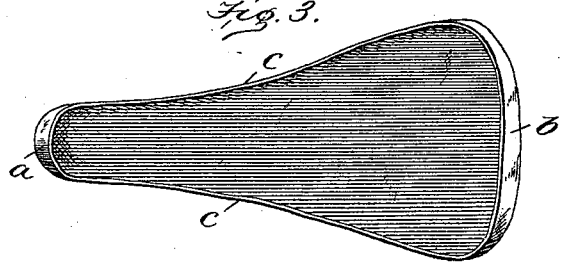
Witnesses
Edwin L. Bradford
Curtis Hammond
Wm C. McIntire Inventor
THE NORRIS PETERS CO., PHOTO-LITHO., WASHINGTON, D. L.

UNITED STATES PATENT OFFICE.

WILLIAM CRANCH McINTIRE, OF WASHINGTON, DISTRICT OF COLUMBIA.

COVER FOR BICYCLE-SADDLES.

SPECIFICATION forming part of Letters Patent No. 536,538, dated March 26, 1895.

Application filed October 16, 1893. Serial No. 488,301. (No model.)

*To all whom it may concern:*

Be it known that I, WILLIAM CRANCH MCINTIRE, a citizen of the United States, residing at Washington city, in the District of Columbia, have invented certain new and useful Improvements in Covers for Bicycle-Saddles; and I do hereby declare the following to be a full, clear, and exact description of the invention, such as will enable others skilled in the art to which it appertains to make and use the same.

My invention relates to a new and useful cover or shield for bicycle saddles.

In the use of bicycles in wet weather the saddle, when not occupied by the rider and not under cover, is subjected to the action of the rain, and the leather becomes thoroughly saturated, which not only renders it extremely disagreeable to ride upon, but also tends to its becoming stretched under the weight of the rider.

The object of my invention is to provide a shield or cover which may be quickly placed in position to protect the saddle and readily removed and placed within the tool case or the pocket of the rider; and with these ends in view my invention consists of a saddle cover composed of elastic waterproof material of the same general form of the saddle, and formed or provided at the cantle and pommel ends with means by which it may be readily secured in place.

In order that those skilled in the art may fully understand my invention I will proceed to describe the same referring by letters to the accompanying drawings, in which—

Figure 1 is a side view of the leather portion of a bicycle saddle with my improved cover applied thereto and shown in section. Fig. 2 is a top or plan view of the cover; Fig. 3, a bottom view showing the under side; and Figs. 4 and 5 views showing modifications hereinafter more fully described.

Similar letters of reference denote like parts in the several views.

A represents the leather portion of an ordinary bicycle saddle, all of which have a narrow pommel and broadening out toward the cantle. To the cantle and the pommel metal plates are secured, through the medium of which the saddle is secured to the springs and then to the saddle post. The pommel and cantle are rounded and turned downward, as illustrated at Fig. 1, and my improved cover B has its front and rear ends or edges turned downwardly correspondingly as seen at *a*, *b*, and its side edges may also be turned downwardly, as seen at *c*, *c*, Fig. 3, although this feature of construction may be omitted and the cover made wide enough to naturally droop sufficiently to form a complete shield and water-shed.

I prefer to make the cover of ordinary rubber, but it may be made of any other elastic waterproof material; and in lieu of forming it with the pocket shaped front and rear construction, it may be provided with hook-shaped attachments of any kind, such as wire or thin sheet metal, adapted to embrace the corresponding ends of the saddle leather, as clearly shown at Figs. 4 and 5,—the former of which shows metal plates secured by rivets to the cover, and the latter wire hooks similarly secured in place.

From the construction shown and described it will be readily seen that the cover may be rolled or folded within itself and carried in the pocket of the rider or in the leather box usually attached to the under side of the saddle; and that the elasticity will give to the cover the capability of being stretched to accommodate itself to saddles of varying lengths.

I am aware that soft porous cushions have been secured in place upon saddles to provide a yielding seat, and that covers made of rubber and adapted to be inflated with air have also been devised, and that in both cases the cushion is especially designed to be interposed between the seat of the rider and the saddle to constitute a pad.

What I claim as new, and desire to secure by Letters Patent, is—

As a new article of manufacture a bicycle saddle cover composed of waterproof elastic material, with overlapping flanges to embrace the edges of the saddle, and adapted to be held in position by the contractive action of the material, substantially as and for the purpose set forth.

In testimony whereof I affix my signature in presence of two witnesses.

WM. CRANCH McINTIRE.

Witnesses.
 WM. M. HANNAY,
 N. CURTIS LAMMOND.